(12) United States Patent
Tsubaki et al.

(10) Patent No.: US 12,060,110 B2
(45) Date of Patent: Aug. 13, 2024

(54) VEHICLE BODY STRUCTURE

(71) Applicant: KOBE STEEL, LTD., Hyogo (JP)

(72) Inventors: Shota Tsubaki, Kobe (JP); Kenichi Watanabe, Kobe (JP); Kazuya Yasui, Kobe (JP); Sadao Miyazawa, Kobe (JP); Keisuke Nakato, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 349 days.

(21) Appl. No.: 17/597,695

(22) PCT Filed: Jun. 22, 2020

(86) PCT No.: PCT/JP2020/024438
§ 371 (c)(1),
(2) Date: Jan. 18, 2022

(87) PCT Pub. No.: WO2021/019959
PCT Pub. Date: Feb. 4, 2021

(65) Prior Publication Data
US 2022/0258802 A1  Aug. 18, 2022

(30) Foreign Application Priority Data

Aug. 1, 2019  (JP) .................................. 2019-141931

(51) Int. Cl.
*B62D 25/02*     (2006.01)
*B60K 1/04*      (2019.01)
(Continued)

(52) U.S. Cl.
CPC .............. *B62D 25/025* (2013.01); *B60K 1/04* (2013.01); *B62D 21/15* (2013.01); *B62D 21/157* (2013.01);
(Continued)

(58) Field of Classification Search
CPC .. B62D 25/05; B62D 25/2036; B62D 21/157; B62D 25/025
(Continued)

(56) References Cited

U.S. PATENT DOCUMENTS 10,370,040 B1 *  8/2019  Cooper ................ B62D 21/157
10,926,804 B2 *  2/2021  Yang ..................... B62D 25/025
(Continued)

FOREIGN PATENT DOCUMENTS

JP     2007-237944 A     9/2007
JP     2013-252816 A    12/2013
(Continued)

OTHER PUBLICATIONS

International Search Report issued in PCT/JP2020/024438; mailed Sep. 8, 2020.
(Continued)

*Primary Examiner* — Dennis H Pedder
(74) *Attorney, Agent, or Firm* — Studebaker & Brackett PC

(57) ABSTRACT

A vehicle body structure includes: a battery disposed at a vehicle body central lower portion, i.e., at a central lower portion of the vehicle body; a side sill of a hollow shape, the side sill disposed at an outer side of the battery in a vehicle width direction and extending in a vehicle longitudinal direction; a reinforcement member disposed inside the side sill, having a closed cross section of a polygonal shape, and having a continuous cylindrical structure where a plurality of the closed cross sections are continuous when viewed in the vehicle width direction; and a deformation control member attached to the reinforcement member and configured to control a deformation of the continuous cylindrical structure of the reinforcement member in the vehicle longitudinal direction.

14 Claims, 17 Drawing Sheets

(51) Int. Cl.
  *B62D 21/15* (2006.01)
  *B62D 25/20* (2006.01)
  *B62D 29/00* (2006.01)
(52) U.S. Cl.
  CPC ........... *B62D 25/20* (2013.01); *B62D 29/007* (2013.01); *B62D 29/008* (2013.01)
(58) Field of Classification Search
  USPC ........ 296/209, 29, 30, 204, 23.01, 3, 187.12
  See application file for complete search history.

(56) References Cited

U.S. PATENT DOCUMENTS

| | | | | |
|---|---|---|---|---|
| 2002/0060462 | A1* | 5/2002 | Glance | F16F 3/0876 |
| | | | | 428/34.1 |
| 2015/0158532 | A1* | 6/2015 | Ayuzawa | B62D 25/20 |
| | | | | 296/193.07 |
| 2015/0360733 | A1 | 12/2015 | Nagwanshi et al. | |
| 2018/0065678 | A1* | 3/2018 | Tutzer | B62D 29/043 |
| 2018/0148099 | A1 | 5/2018 | Ayukawa | |
| 2018/0148106 | A1 | 5/2018 | Ayukawa | |
| 2019/0168809 | A1 | 6/2019 | Ayukawa | |

FOREIGN PATENT DOCUMENTS

| | | |
|---|---|---|
| JP | 2018-090020 A | 6/2018 |
| JP | 2018-090021 A | 6/2018 |

OTHER PUBLICATIONS

International Preliminary Report on Patentability and Written Opinion issued in PCT/JP2020/024438; mailed Feb. 10, 2022.

* cited by examiner

VEHICLE BODY STRUCTURE

CROSS-REFERENCE TO RELATED APPLICATIONS

This is a national phase application in the United States of International Patent Application No. PCT/JP2020/024438 with an international filing date of Jun. 22, 2020, which claims priority of Japanese Patent Application No. 2019-141931 filed on Aug. 1, 2019 the contents of which are incorporated herein by reference.

TECHNICAL FIELD

The present invention relates to a vehicle body structure.

BACKGROUND ART

An electric vehicle is required, in terms of protection for a battery or others, to have a more improved collision safety performance than a general fuel vehicle. An electric vehicle frequently has a battery disposed in an entire underfloor region of a vehicle cabin such that a running distance of the electric vehicle is secured. Thus, the electric vehicle is required of the improved collision safety performance particularly at side collision of the electric vehicle (hereinafter, referred to as a "side collision safety performance"). In other words, when a side portion of the electric vehicle collides with an object, e.g., a pole, due to a spin or the like of the electric vehicle, the electric vehicle is required to have the vehicle cabin or the battery not damaged but protected.

For example, JP 2018-90020 A and JP 2018-90021 A disclose a vehicle body lower structure that is configured to restrict deformation of the vehicle cabin and improve the side collision safety performance of the electric vehicle. In the vehicle body lower structure, in order to obtain the improved side collision safety performance, a reinforcement member is disposed inside a columnar member at a lower side of the vehicle body, the columnar member referred to as a side sill. With this configuration, a strength and a collision energy absorption performance of the side sill is improved.

SUMMARY OF THE INVENTION

In the vehicle body lower structure disclosed in each of JP 2018-90020 A and JP 2018-90021 A, the reinforcement member has a closed cross section when viewed in a vehicle longitudinal direction, and extends in a substantially same direction as the side sill. With such a reinforcement member, when the side portion of the vehicle body is subjected to force, a side portion of the reinforcement member is concurrently subjected to the force. With this configuration, a great tensile stress in a longitudinal direction is induced to an inner part of the reinforcement member in a width direction of the vehicle body, and the reinforcement member is prone to be bent and broken. When the reinforcement member is bent and broken, reaction force is not generated in the reinforcement member. Thus, the collision energy is not absorbed, and the side collision safety performance is degraded. Further, such a reinforcement member is prone to fall on either side (fall in a vehicle height direction) when the vehicle body side collides with an object, e.g., a pole. When the reinforcement member falls on either side, the reaction force is rapidly reduced, thereby degrading the side collision safety performance.

An object of the present invention is to provide a vehicle body structure having the improved side collision safety performance.

The present invention provides a vehicle body structure including:
- a battery disposed at a central lower portion of a vehicle body;
- a side sill of a hollow shape, the side sill disposed at an outer side of the battery in a vehicle width direction and extending in a vehicle longitudinal direction;
- a reinforcement member disposed inside the side sill, having a closed cross section of a polygonal shape, and having a continuous cylindrical structure where a plurality of the closed cross sections are continuous when viewed in the vehicle width direction; and
- a deformation control member attached to the reinforcement member and configured to control a deformation of the continuous cylindrical structure of the reinforcement member in the vehicle longitudinal direction.

With this configuration, when viewed in the vehicle width direction, the continuous cylindrical structure is formed inside the side sill, and the plurality of closed cross sections of polygonal shape are continuous in the continuous cylindrical structure. Typically, the cylindrical structure is easily bent and deformed by a load applied to a side portion of the cylindrical structure; but on the other hand, the cylindrical structure is strong against a load in an axial direction of the cylindrical structure. With the arrangement described above, the side collision load on the vehicle body results in the load applied to the cylindrical structure in the axial direction of the cylindrical structure. Further, with the configuration described above, the deformation control member controls (for example, restricts) the deformation of the continuous cylindrical structure of the reinforcement member in the vehicle longitudinal direction. With this configuration, even at the side collision of the vehicle body, it is possible to maintain a shape of the continuous cylindrical structure of the reinforcement member. For example, the continuous cylindrical structure is less prone to be forced to spread out in the vehicle longitudinal direction. Accordingly, at the side collision of the vehicle body, the reinforcement member is less prone to be broken by bending deformation or is less prone to fall on either side, so that the reaction force of the reinforcement member is improved. Still accordingly, the collision energy absorption performance is improved and a vehicle cabin and the battery are thus reliably protected, thereby securing a side collision safety performance required of an electric vehicle.

The deformation control member may be attached to an end portion of the reinforcement member in the vehicle width direction. The end portion of the reinforcement in the vehicle width direction may be an outer end portion of the reinforcement member in the vehicle width direction.

With this configuration, while the reinforcement member is presumed to be easily deformed at the side collision of the vehicle body, it is possible to restrict the deformation of the end portion (particularly, the outer end portion) of the reinforcement member in the vehicle width direction.

The reinforcement member may be formed of two or more plate materials attached to each other, each of the two or more plate materials made of aluminum alloy or steel.

Here, the reinforcement member is formed of the plate materials and is thus easily manufactured. This configuration increases versatility of the reinforcement member.

The deformation control member is plate shaped and is bonded to the reinforcement member (as the plate materials) in a state of being sandwiched between the plate materials;

and when viewed in the vehicle width direction, the deformation control member may have a wavy portion formed in a wave shape.

With this configuration, the deformation control member, having the wavy portion, is elastic to a certain degree in the vehicle longitudinal direction. Accordingly, it is possible to maintain deformation effective enough to absorb the collision energy at the side collision of the vehicle body, and concurrently, it is possible to improve the collision energy absorption performance. Here, "bonding" may be welding or mechanical bonding in a broad aspect. The same applies to descriptions below.

When viewed in the vehicle width direction, the deformation control member having the wavy portion may have a linear length increased to 1.2 times or more a linear length that the deformation control member of a straight line shape has.

With this configuration, the deformation control member is sufficiently elastic in the vehicle longitudinal direction. Accordingly, it is possible to maintain the deformation effective enough to absorb the collision energy at the side collision of the vehicle body, and concurrently, it is possible to further improve the collision energy absorption performance.

The reinforcement member or the deformation control member may be bonded to the side sill at an outer end portion of the reinforcement member or at an outer end portion of the deformation control member in the vehicle width direction.

With this configuration, at the side collision of the vehicle body, the side sill and the reinforcement member, or the side sill and the deformation control member, are integrally deformed. Accordingly, the reinforcement member is less prone to be broken by bending deformation or is less prone to fall on either side, so that the reaction force of the reinforcement member is improved. Still accordingly, the collision energy absorption performance is improved and a vehicle cabin and the battery are thus reliably protected, thereby securing a side collision safety performance required of an electric vehicle.

The continuous cylindrical structure may be formed in a single row when viewed in the vehicle width direction.

The continuous cylindrical structure is formed in the single row as described above, so that within a limited space inside the side sill, a size of each of the closed cross sections of polygonal shape is maintained at the maximum level. For example, when each of the closed cross sections of polygonal shape is longitudinally crushed flat, a lateral width of the corresponding closed cross section is extended; and conversely, when each of the closed cross sections of polygonal shape is laterally crushed flat, the lateral width of the corresponding closed cross section is shortened. The size of each of the closed cross sections is maintained at the maximum level, so that the corresponding closed cross section is easily crushed while significant reaction force is maintained. With this configuration, it is possible to maintain elasticity of the reinforcement member at the maximum level. Accordingly, the collision energy absorption performance is improved and the side collision safety performance is thus improved.

Each of the closed cross sections may be formed in a hexagonal or more polygonal shape.

Due to the hexagonal or more polygonal shape that has more bending points than a quadrangle shape, a cross section of the reinforcement member, which is taken perpendicular to the vehicle width direction, is easily deformed. With this configuration, the elasticity of the reinforcement member is improved. When the elasticity of the reinforcement member is maintained, the reinforcement member is less prone to be bent and broken, leading to the improvement of the side collision safety performance.

Each of the closed cross sections may be formed in an even numbered polygonal shape.

With this configuration, it is easier to secure a flat portion that is to oppose other members such as the side sill when the reinforcement member is attached to the other members, thereby improving attachability of the reinforcement member.

In a vehicle body structure according to the present invention, a reinforcement member and a deformation control member are preferably disposed inside a side sill, thereby improving reaction force of the reinforcement member and resulting in an improved side collision safety performance.

MODE FOR CARRYING OUT THE INVENTION

An embodiment of the present invention will be described below with reference to the appended drawings.

First Embodiment

Figure 1:
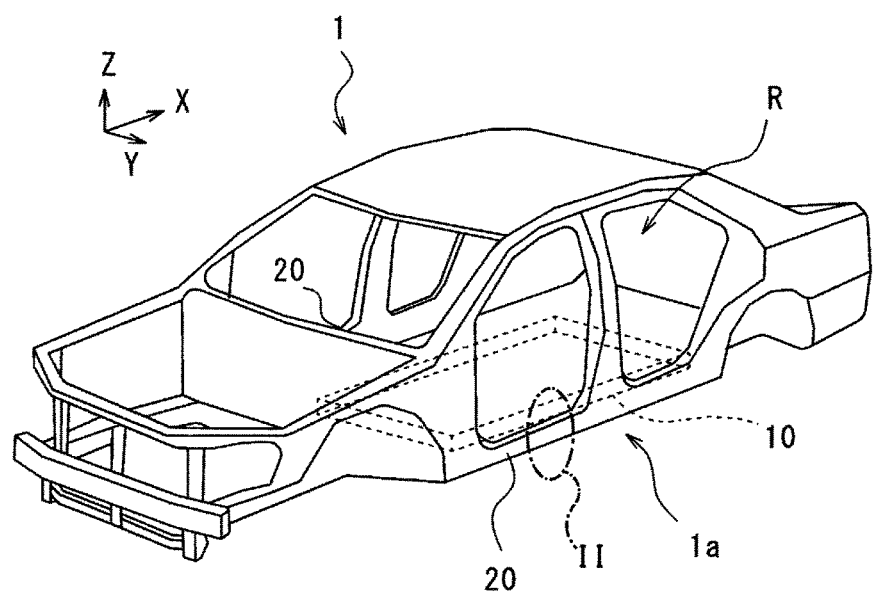
FIG. 1 is a perspective view illustrating a vehicle body structure according to a first embodiment of the present invention.

With reference to FIG. 1, in a vehicle body structure 1 of this embodiment, a battery 10 for vehicle propulsion is disposed at a vehicle body central lower portion 1a, i.e., at a central lower portion of the vehicle body. In other words, the vehicle body structure 1 of this embodiment is applied to an electric vehicle equipped with a battery 10. The battery 10, including its protective case and others, is schematically illustrated, and is disposed in an entire underfloor region of a vehicle cabin R. In this embodiment, descriptions will be given to the vehicle body structure 1 having an improved side collision safety performance, that is, the vehicle body structure 1, where when a side portion of the vehicle body collides (in other words, when the vehicle side collides) with an object, e.g., a pole, due to a spin or the like of the vehicle body, the vehicle cabin R or the battery 10 is not damaged but protected.

In FIG. 1, a side (specifically a left side) of the vehicle body is denoted with a symbol Y, a rear side of the vehicle body is denoted with a symbol X, and an upper side of the vehicle body is denoted with a symbol Z. In other words, a vehicle width direction corresponds to an orientation Y and an orientation opposite the orientation Y; a vehicle longitudinal direction corresponds to an orientation X and an orientation opposite the orientation X; and a vehicle height direction corresponds to an orientation Z and an orientation opposite the orientation Z. The same applies to FIG. 2 and all appended drawings subsequent to FIG. 2.

At each of outer sides of the battery 10 in the vehicle width direction, a side sill 20 is disposed as a pair; and, each of the side sills 20 has a hollow shape and extends in the vehicle longitudinal direction. The side sills 20 as the pair are disposed along both lower sides of the vehicle cabin R. Each of the side sills 20 is also referred to as a rocker in the vehicle body structure 1.

Figure 2:
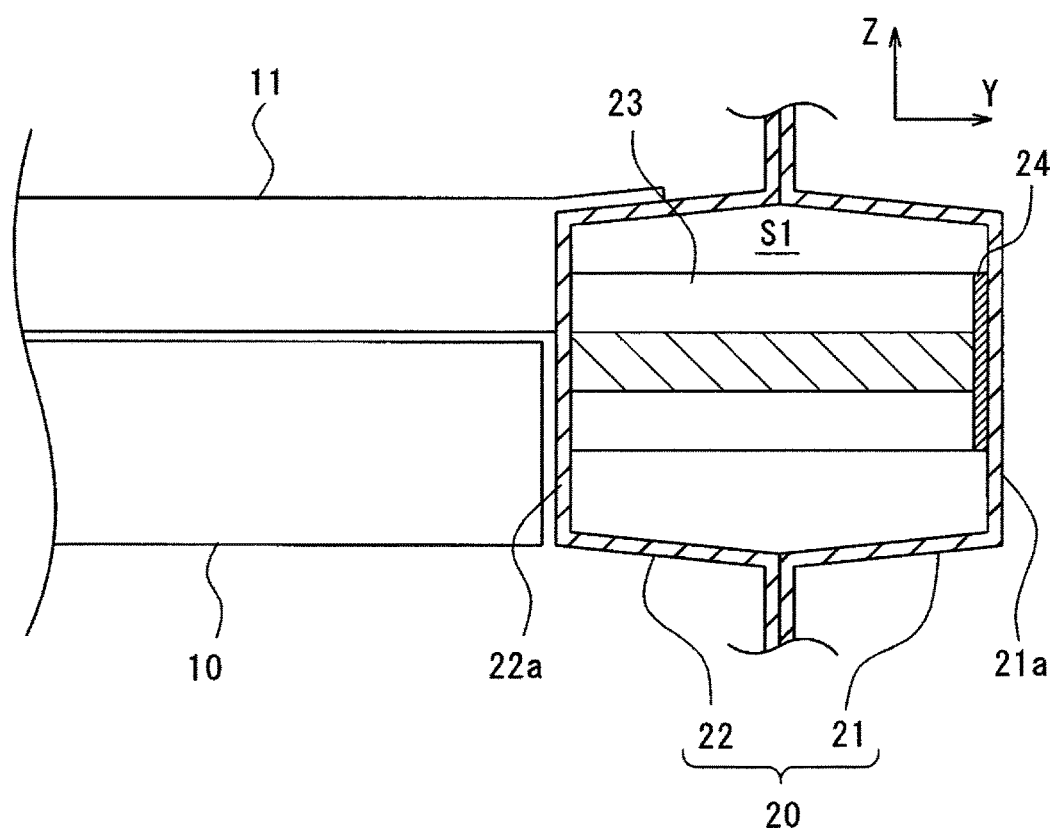
FIG. 2 is a cross-sectional view of a portion of a side sill perpendicular to a vehicle longitudinal direction, the portion indicated by an ellipse II in FIG. 1.

With reference to FIG. 2, a plurality of cross members 11 are disposed at an upper side of the battery 10 and extend in the vehicle width direction. The side sills 20 as the pair are connected at upper portions thereof via the plurality of cross members 11. Note that, in FIG. 2, only one of the side sills 20 as the pair is illustrated.

In this embodiment, each of the side sills 20 is formed of an outer member 21 disposed at an outer side in the vehicle width direction and an inner member 22 disposed at an inner side in the vehicle width direction; and the outer member 21 and the inner member 22 are attached to each other. Each of the outer member 21 and the inner member 22 is, for example, a plate material made of steel. Each of the outer member 21 and the inner member 22 is bent into a hat shape and is attached to the other by welding, so as to form a space S1 of hollow shape. The space S1 extends in the vehicle longitudinal direction. In the space S1, a reinforcement member 23 and a deformation control member 24 are disposed. Each of the outer member 21 and the inner member 22 may alternatively be, for example, a plate material made of aluminum alloy.

In the vehicle width direction, the reinforcement member 23 is disposed such that one end of the reinforcement member 23 abuts an inner surface of a projection 21a of the outer member 21 of the hat shape, and such that the other end of the reinforcement member 23 abuts an inner surface of a projection 22a of the inner member 22 of the hat shape. In the vehicle height direction, the reinforcement member 23 is disposed across the plurality of cross members 11 and the battery 10. With this configuration, even when the side portion of the vehicle body collides with the object, e.g., the pole, it is possible to disperse the side collision load from each of the side sills 20 to the battery 10 and the plurality of cross members 11. In the vehicle height direction, the reinforcement member 23 is disposed with a gap from the outer member 21 and the inner member 22.

In this embodiment, the deformation control member 24 is a plate material having a flat belt shape with a constant width. The deformation control member 24 is attached to an outer end surface of the reinforcement member 23 in the vehicle width direction. The deformation control member 24 is bonded to the reinforcement member 23 by welding or others. Specifically, when viewed at the outer side in the vehicle width direction, the reinforcement member 23 is hidden behind the deformation control member 24 and is thus not visible. Note that, the deformation control member 24 is not limited to the size above, and may be sized to cover a part of the outer end surface of the reinforcement member 23.

Figure 3:
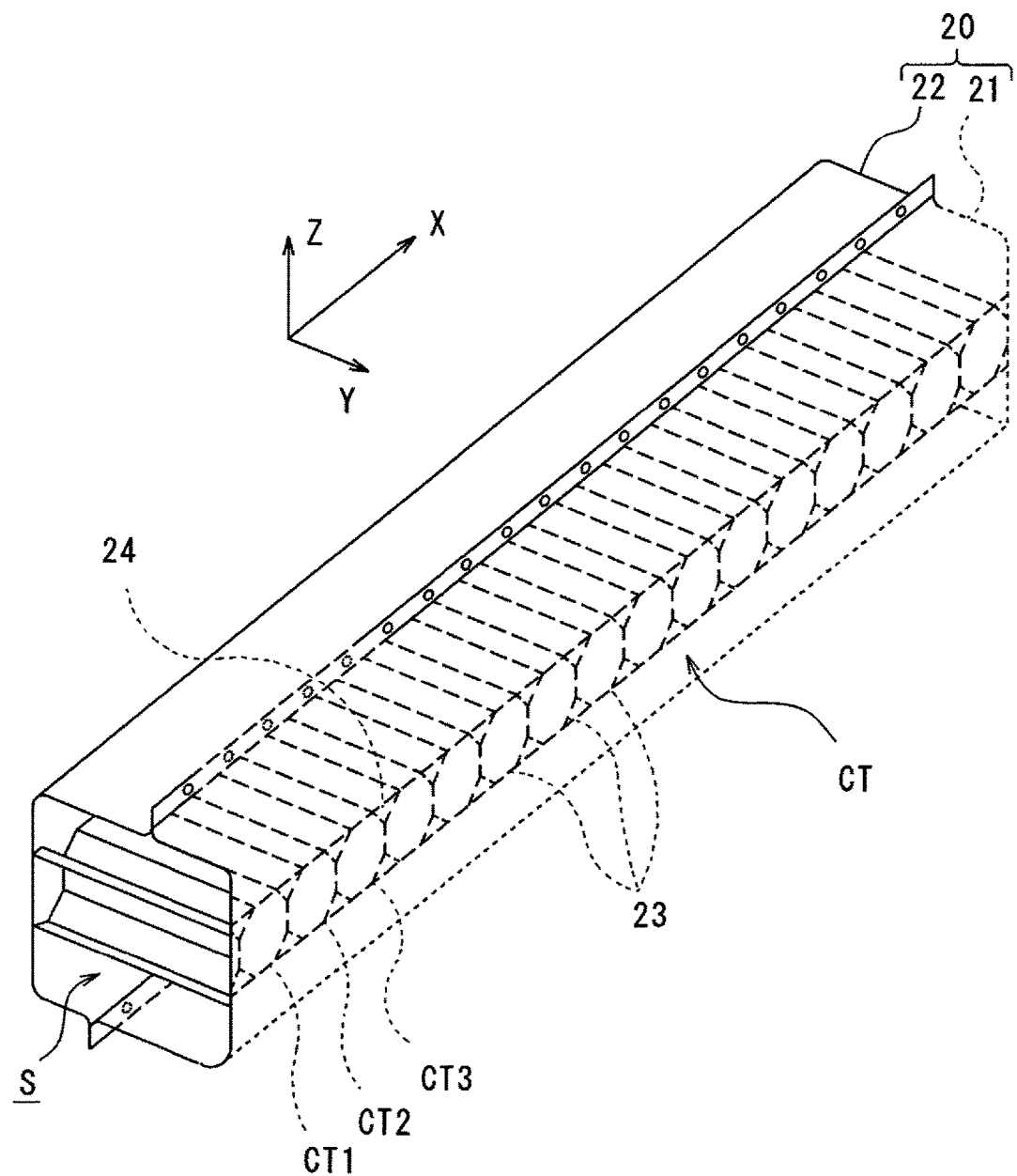
FIG. 3 is a perspective view of a portion of the side sill where an outer member and a deformation control member are illustrated in transparent form.

With reference to FIG. 3, the reinforcement member 23 forms a continuous cylindrical structure CT inside each of the side sills 20. The continuous cylindrical structure CT includes a plurality of cylindrical bodies, i.e., a CT1, a CT2, a CT3, and more, each extending in the vehicle width direction; and the plurality of cylindrical bodies are continuously disposed in the vehicle longitudinal direction. When viewed in the vehicle width direction, in the continuous cylindrical structure CT, a plurality of closed cross sections, each having a polygonal shape, are continuous in the vehicle longitudinal direction.

In this embodiment, the reinforcement member 23 is an extruded member of 6000 series or 7000 series aluminum alloy, and the continuous cylindrical structure CT is integrally formed. In other words, the reinforcement member 23 is a single component. The deformation control member 24 may be formed of the same material as the reinforcement member 23.

The reinforcement member 23 is a single component, so that it is possible to dispose the reinforcement member 23 inside the side sill 20 when the reinforcement member 23 has formed a desired closed cross section therein. With this configuration, the vehicle body structure 1 is easily designed.

The reinforcement member 23 is an extruded member of 6000 series or 7000 series aluminum alloy, so that the reinforcement member 23 secures a higher level of material strength and elasticity to absorb collision energy. The higher level of material strength and elasticity is required to absorb the collision energy and thus, the reinforcement member 23 is preferably made of a metal material such as an aluminum material. When the reinforcement member 23 is possibly formed of a resin material, the reinforcement member 23 is not sufficient in material strength and is thus prone to be easily bent and broken. The aluminum material is particularly preferable as an extruded material, and is highly manufacturable. Note that, the reinforcement member 23 is not limited to the extruded member of aluminum alloy as described above. Alternatively, the reinforcement member 23 may be made of, for example, steel.

The deformation control member 24 is a plate material extending in an X-Z plane and in the vehicle longitudinal direction. The deformation control member 24 is bonded to the reinforcement member 23 by welding or others, and is configured, as will be described later, to control (restrict) deformation of the continuous cylindrical structure CT of the reinforcement member 23 in the vehicle longitudinal direction. The deformation control member 24 is attached to an end portion (an outer end portion in examples of the appended drawings) of the reinforcement member 23 in the vehicle width direction.

Figure 4:
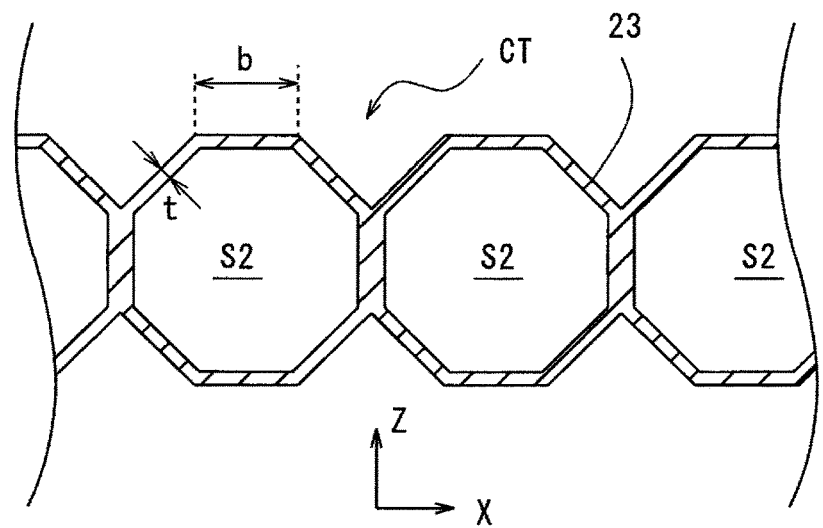
FIG. 4 is a cross-sectional view of a reinforcement member perpendicular to a vehicle width direction, the reinforcement member arranged in a single row.

With reference to FIG. 4, in the continuous cylindrical structure CT of this embodiment, the closed cross sections of regular octagonal shape are arranged in a single row. Inside each of the closed cross sections of regular octagonal shape in the continuous cylindrical structure CT, a space S2 extending in the vehicle width direction is formed. In each of the closed cross sections of regular octagonal shape, a pair of walls oppose each other in the vehicle longitudinal direction, another pair of walls oppose each other in the vehicle height direction, and still another two pairs of walls oppose each other to cross the first two pairs of walls. In this single row arrangement, each of the closed cross sections of regular octagonal shape shares one side with the others of the close cross sections adjacent to the corresponding closed cross section. Here, t represents a plate thickness of the reinforcement member 23, and b represents a length of the one side of each of the closed cross sections of regular octagonal shape of the reinforcement member 23. Taking into consideration the efficiency of absorbing the collision energy at each of the sides of the closed cross section of polygonal shape, and by referring to the Carman equation, the plate thickness t and the length b of the reinforcement member 23 are preferably expressed by Mathematical Formula 1 below.

Mathematical Formula 1

$$\left(\frac{t}{b}\right)^2 > 0.18 \frac{\sigma y}{E} \quad (1)$$

σy: yield stress of the reinforcement member
E: Young's modulus of the reinforcement member In the Mathematical Formula 1 above, the reinforcement member 23 has dimensions of, for example, the plate thickness t=2 mm and the length b of the one side of each of the closed cross sections of regular octagonal shape (hereinafter, referred to as the "length b of the one side of the regular octagonal shape")=87 mm, where the reinforcement member 23 is made of aluminum alloy having a Young's modulus E of 68 GPa and a yield stress σy of 200 MPa. Similarly, the reinforcement member 23 may have dimensions of the plate thickness t=3 mm and the length b of the one side of the regular octagonal shape=130 mm. Alternatively, the reinforcement member 23 may have dimensions of the plate thickness t=2 mm and the length b of the one side of the regular octagonal shape=82 mm, where the reinforcement member 23 is made of steel having the Young's modulus E of 210 GPa and the yield stress σy of 700 MPa. Similarly, the reinforcement member 23 may have dimensions of the plate thickness t=1.6 mm and the length b of the one side of the regular octagonal shape=65 mm.

In the continuous cylindrical structure CT, each of the closed cross sections has the regular octagonal shape but is not limited thereto, and may preferably be formed in a hexagonal or more polygonal shape. More preferably, the continuous cylindrical structure CT is formed in the single row; each of the closed cross sections has the hexagonal or more even numbered polygonal shape; and the continuous cylindrical structure CT has a side surface parallel to an X-Y plane of FIG. 3.

Figure 5A:
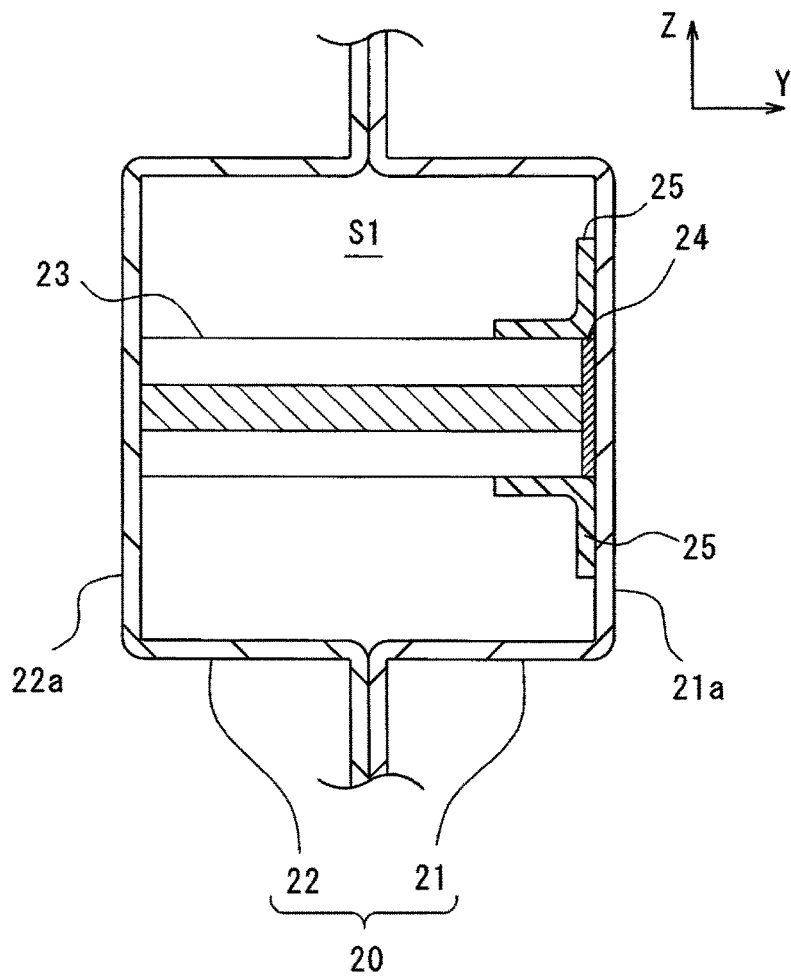
FIG. 5A is a cross-sectional view of a portion of the side sill perpendicular to the vehicle longitudinal direction, the cross-sectional view illustrating a method to fix the reinforcement member.
Figure 5B:
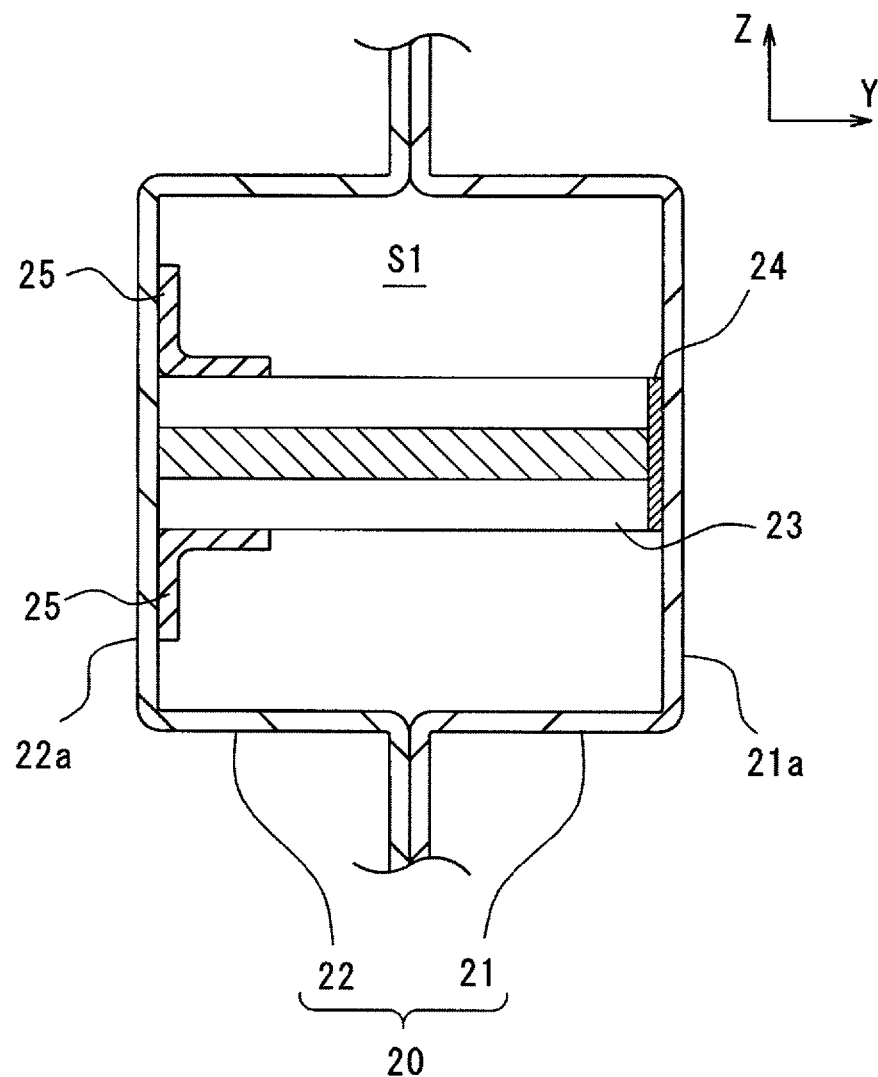
FIG. 5B is a cross-sectional view of the portion of the side sill perpendicular to the vehicle longitudinal direction, the cross-sectional view illustrating another method to fix the reinforcement member.

With reference to FIG. 5A, an example of a method to fix the reinforcement member 23 will be described. The reinforcement member 23 is fixed to the inner surface of the side sill 20. In this embodiment, the reinforcement member is fixed via, for example, a bracket 25 of L shape. Specifically, the reinforcement member 23 is fixed, at its outer end portion in the vehicle width direction, to the outer member 21 via the bracket 25. The brackets 25 are disposed at the outer end portion of the reinforcement member 23 in the vehicle width direction, and top to bottom in the vehicle height direction. In the vehicle longitudinal direction, the brackets 25 may be disposed continuously or at a distance from each other. Each of the brackets 25 is bonded to the side sill 20 and concurrently to the reinforcement member 23 via a flow drill screw (FDS), a self-piercing rivet (SPR), spot welding, arc welding, brazing, or others. In FIGS. 2 and 3, the bracket 25 is omitted. Note that, the method to fix the reinforcement member 23 is not limited to that illustrated in FIG. 5A. For example, as illustrated in FIG. 5B, the reinforcement member 23 may be, at its inner end portion in the vehicle width direction, fixed to the inner member 22 via each of the brackets 25. Alternatively, the reinforcement member 23 is fixed not only via the bracket 25 but in any manner.

Figure 6:
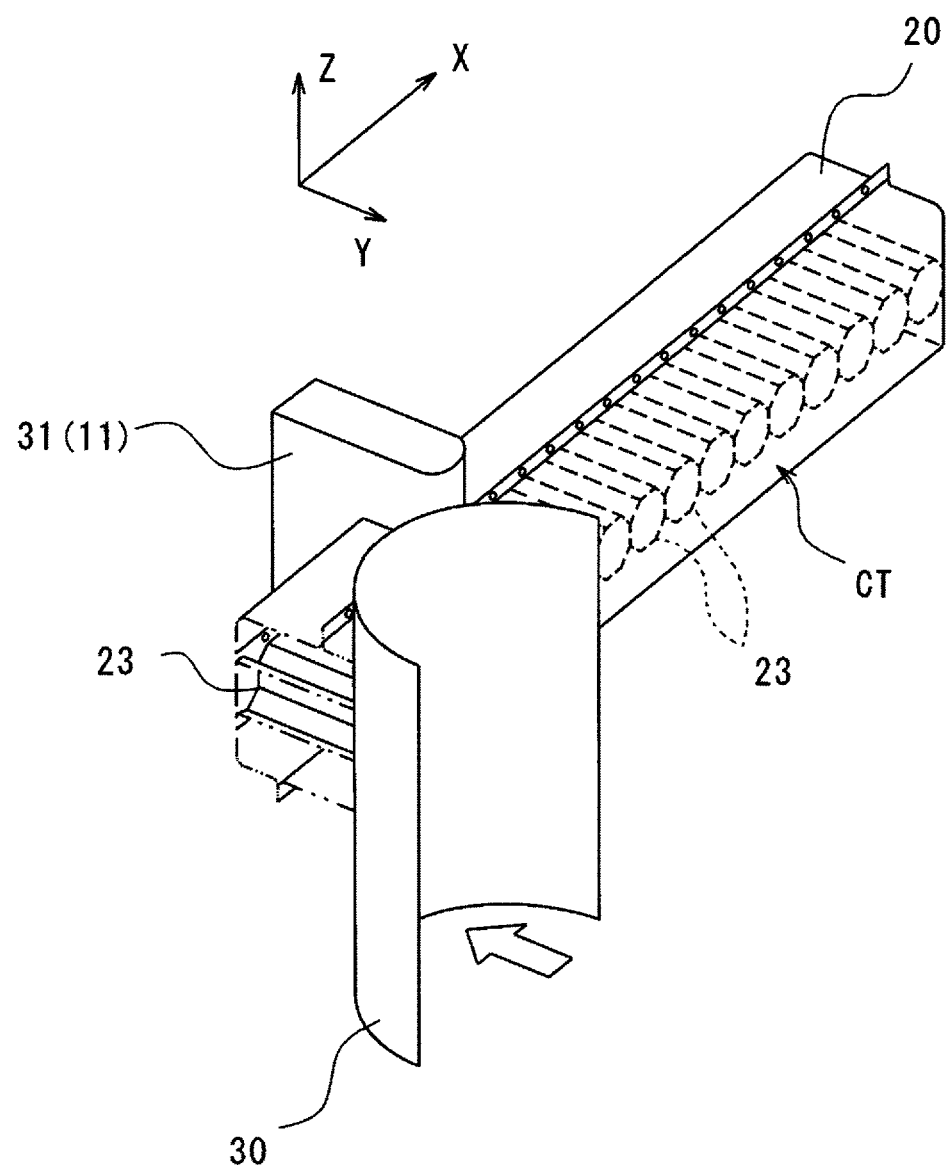
FIG. 6 is a schematic perspective view illustrating the vehicle body structure according to an embodiment in a simulation where a side collision occurs.
Figure 7:
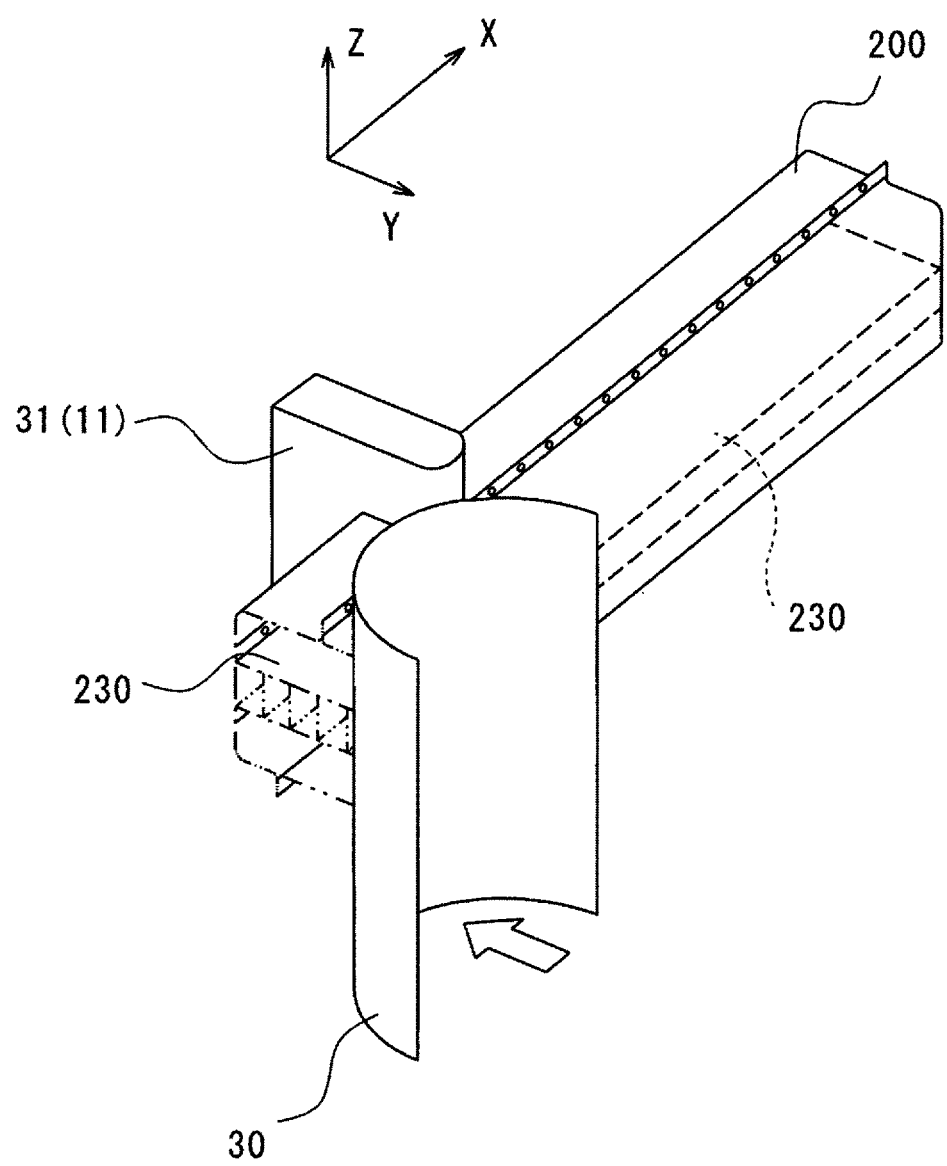
FIG. 7 is a schematic perspective view illustrating a vehicle body structure according to a comparative example in the simulation where the side collision occurs.

With reference to FIGS. 6 and 7, an influence of the reinforcement member 23 on the side collision safety performance of the side sill 20 will be described. In order to compare the side collision safety performance of the side sill 20 (see FIG. 6) in the vehicle body structure 1 of this embodiment with a side collision safety performance of a side sill 200 (see FIG. 7) of a comparative example, the inventors conducted a simulation for a side collision with a pole 30. Here, each of a part of the side sill 20 and a part of the side sill 200 was fixed with a support member 31 as an imitation of the cross member 11, and the simulation simulated a state where the vehicle body collided, at its outer side in the vehicle width direction, with the pole 30. In FIGS. 6 and 7, the side sills 20 and 200 are respectively cut open to show inside the side sills 20 and 200 (see two-dot chain lines), but in reality, the side sills 20 and 200 further extend in the vehicle longitudinal direction. Specifically, FIGS. 6 and 7 only illustrate a half of the side sills 20 and 200 from the centers of the side sills 20 and 200 in the X direction toward a positive direction. Concurrently, FIGS. 6 and 7 only illustrate an inner half of the pole 30 in the vehicle width direction.

FIG. 6 illustrates the side sill 20 of this embodiment in a state where the deformation control member 24 is omitted, and FIG. 7 illustrates the side sill 20 of the comparative example. FIG. 6 differs from FIG. 7 only in the configuration of the reinforcement member 23 inside the side sill 20. The reinforcement member 23 of this embodiment in FIG. 6 has an even thickness of 3 mm. A reinforcement member 230 of the comparative example in FIG. 7 has a closed cross section when viewed in the vehicle longitudinal direction, and extends in the same direction as the side sill 200. The closed cross section has a rectangular shape, and the closed cross sections of rectangular shape are continuous in a single row in the vehicle width direction. With regard to the thickness of the reinforcement member 23, the reinforcement member 23 has an upper wall and a lower wall perpendicular to the vehicle height direction, the upper wall and the lower wall of 4 mm, and has a side wall and a dividing wall perpendicular to the vehicle width direction, the side wall and the dividing wall of 2 mm.

The simulation was conducted under the conditions above, and Table 1 below shows a result of the simulation. Output values for the simulation represent an average reaction force in the vehicle width direction, an energy absorption (EA) amount, a weight, and the EA amount per unit weight (EA amount per kilogram) of each of the reinforcement members 23 and 230, in addition to whether or not each of the reinforcement members 23 and 230 falls on either side. When the reinforcement members 23 and 230 are compared in the average reaction force, the EA amount, and the EA amount per kilogram, one exhibiting greater values is preferable; and when compared in the weight, one exhibiting a smaller value is preferable. The reinforcement members are preferably configured not to fall on either side.

TABLE 1

| | Average reaction force | EA amount | Weight | EA amount per kilogram | Fall on side |
|---|---|---|---|---|---|
| This embodiment | 389 kN | 39.0 kJ | 11.4 kg/m | 3.4 kJ/(kg/m) | No |
| Comparative example | 323 kN | 32.4 kJ | 12.3 kg/m | 2.6 kJ/(kg/m) | Yes |

With reference to Table 1, in each of the average reaction force, the EA amount, and the EA amount per kilogram, the value of the reinforcement member of this embodiment was greater than that of the reinforcement member of the comparative example; and in the weight, the value of the reinforcement member of this embodiment was smaller than that of the reinforcement member of the comparative example. With regard to whether or not to fall on either side, the reinforcement member of this embodiment resulted in No, while the reinforcement member of the comparative example resulted in Yes. Accordingly, this embodiment showed more preferable results in all the items than the comparative example. Further, on an assumption that the reinforcement members of this embodiment and of the comparative example exhibit the same EA amount, the reinforcement of this embodiment may be reduced in size in the vehicle width direction by 22% as compared with the reinforcement member of the comparative example.

Figure 8:
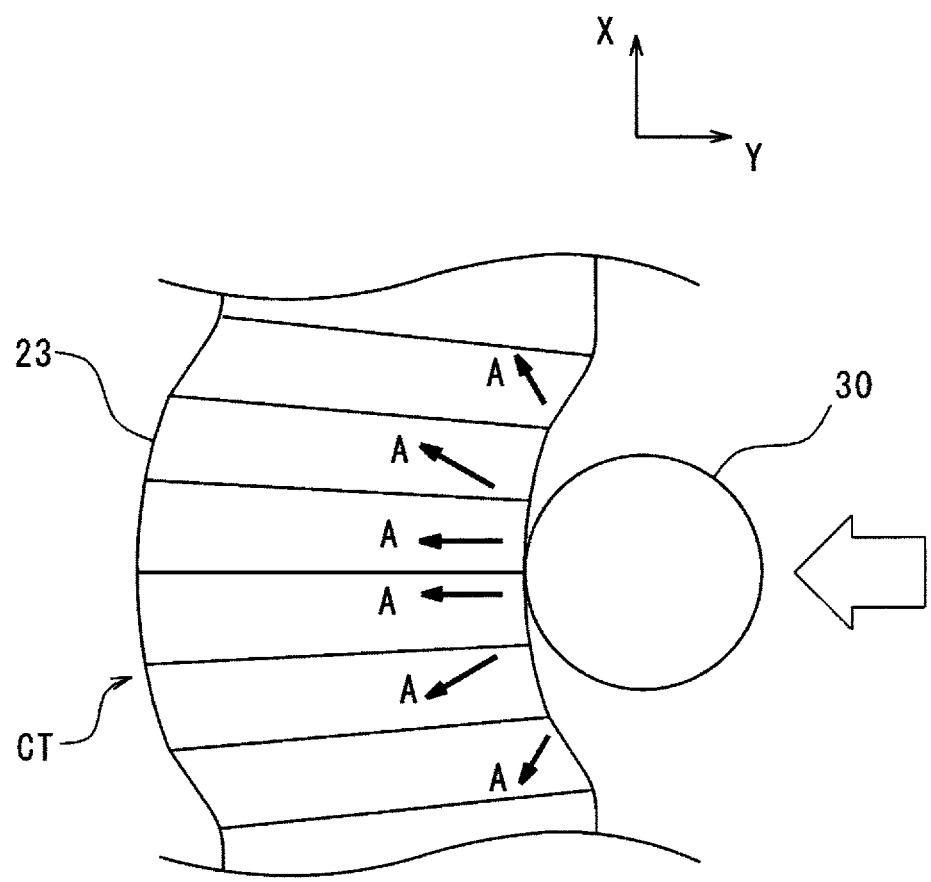
FIG. 8 is a plan view illustrating deformation of the reinforcement member at the side collision with a pole in FIG. 6.

Based on the result of the simulation, the reinforcement member 23 of this embodiment is proved effective; and in this embodiment, the deformation control member 24 is additionally used such that the side collision safety performance is further stabilized. As illustrated in FIG. 6, when the vehicle body side collides with the pole 30, the reinforcement member 23 may not maintain the shape of the continuous cylindrical structure CT. For example, in FIG. 8, the continuous cylindrical structure CT of the reinforcement member 23 is prone to be forced to spread out in the vehicle longitudinal direction and be deformed (see an arrow A in FIG. 8). Here, the reaction force required of the reinforcement member 23 may not be secured. Thus in this embodiment, as illustrated in FIGS. 2 and 3, the deformation control member 24 is attached to the reinforcement member 23 to restrict the deformation of the continuous cylindrical structure CT of the reinforcement member 23 in the vehicle longitudinal direction.

Effects of the vehicle body structure according to this embodiment will be described below.

In this embodiment, as illustrated in FIG. 3, when viewed in the vehicle width direction, the continuous cylindrical structure CT is formed inside the side sill 20, and the plurality of closed cross sections of polygonal shape are continuous in the continuous cylindrical structure. Typically, the cylindrical structure is easily bent and deformed by a load applied to a side portion of the cylindrical structure; but on the other hand, the cylindrical structure is strong against a load in an axial direction of the cylindrical structure. In this embodiment, the side collision load on the vehicle body results in the load applied to each of the cylindrical bodies of the continuous cylindrical structure, i.e., the CT1, the CT2, the CT3, and more, in a central axial direction of the corresponding cylindrical body. Further, with the configuration of the vehicle body structure according to this embodiment, the deformation control member 24 restricts the deformation of the continuous cylindrical structure CT of the reinforcement member 23 in the vehicle longitudinal direction. With this configuration, even at the side collision of the vehicle body, it is possible to maintain the shape of the continuous cylindrical structure CT of the reinforcement member 23. For example, the continuous cylindrical structure CT is less prone to be forced to spread out in the vehicle longitudinal direction. Accordingly, at the side collision of the vehicle body, the reinforcement member 23 is less prone to be bent and deformed, so that the reaction force of the reinforcement member 23 is improved. Still accordingly, the collision energy absorption performance is improved and the vehicle cabin R (see FIG. 1) and the battery 10 (see FIG. 1) are thus reliably protected, thereby securing the side collision safety performance required of an electric vehicle.

The deformation control member 24 is bonded to the end portion (particularly the outer end portion) of the reinforcement member 23 in the vehicle width direction. With this configuration, while the reinforcement member 23 is presumed to be easily deformed at the side collision of the vehicle body, it is possible to restrict the deformation of the end portion (particularly, the outer end portion) of the reinforcement member 23 in the vehicle width direction. Note that, the deformation control member 24 may be attached to an inner end portion of the reinforcement member 23 in the vehicle width direction.

Additionally, the continuous cylindrical structure CT is formed in the single row, so that within the space S1 as a limited space inside the side sill 20, the size of each of the closed cross sections of polygonal shape is maintained at the maximum level. For example, when each of the closed cross sections of polygonal shape (regular octagonal shape in this embodiment) is longitudinally crushed flat, a lateral width of the corresponding closed cross section is extended; and conversely, when each of the closed cross sections of polygonal shape is laterally crushed flat, the lateral width of the corresponding closed cross section is shortened. Accordingly, the size of each of the closed cross sections is maintained at the maximum level, so that the corresponding closed cross section is easily crushed and the elasticity of the reinforcement member 23 is maintained at the maximum level.

In this embodiment, each of the closed cross sections of the reinforcement member 23 is formed in the regular octagonal shape. Due to the hexagonal or more polygonal shape that has more bending points than the quadrangle shape, each of the closed cross sections of the reinforcement member is easily deformed. With this configuration, the elasticity of the reinforcement member 23 is improved. When the elasticity of the reinforcement member 23 is maintained, the reinforcement member 23 is less prone to be bent and broken, leading to the improvement of the side collision safety performance.

In this embodiment, each of the closed cross sections of the reinforcement member 23 has the even numbered polygonal shape (specifically, the regular octagonal shape). With this configuration, it is easier to secure a flat portion that is to oppose other members such as the side sill when the reinforcement member 23 is attached to the other members, thereby improving attachability of the reinforcement member 23.

The configuration and effects of the vehicle body structure according to this embodiment have been described above. Note that, the deformation control member 24 is not limited to the foregoing embodiment and various modifications may be made. The deformation control member 24 according to the various modifications will be described below. Note that, for convenience of the description and the drawings, in an example to be described below, the reinforcement member 23 includes only three of the cylindrical bodies (the CT1, the CT2, and the CT3), but the continuous cylindrical structure CT of the reinforcement member 23 is not limited thereto.

First Modification

Figure 9:
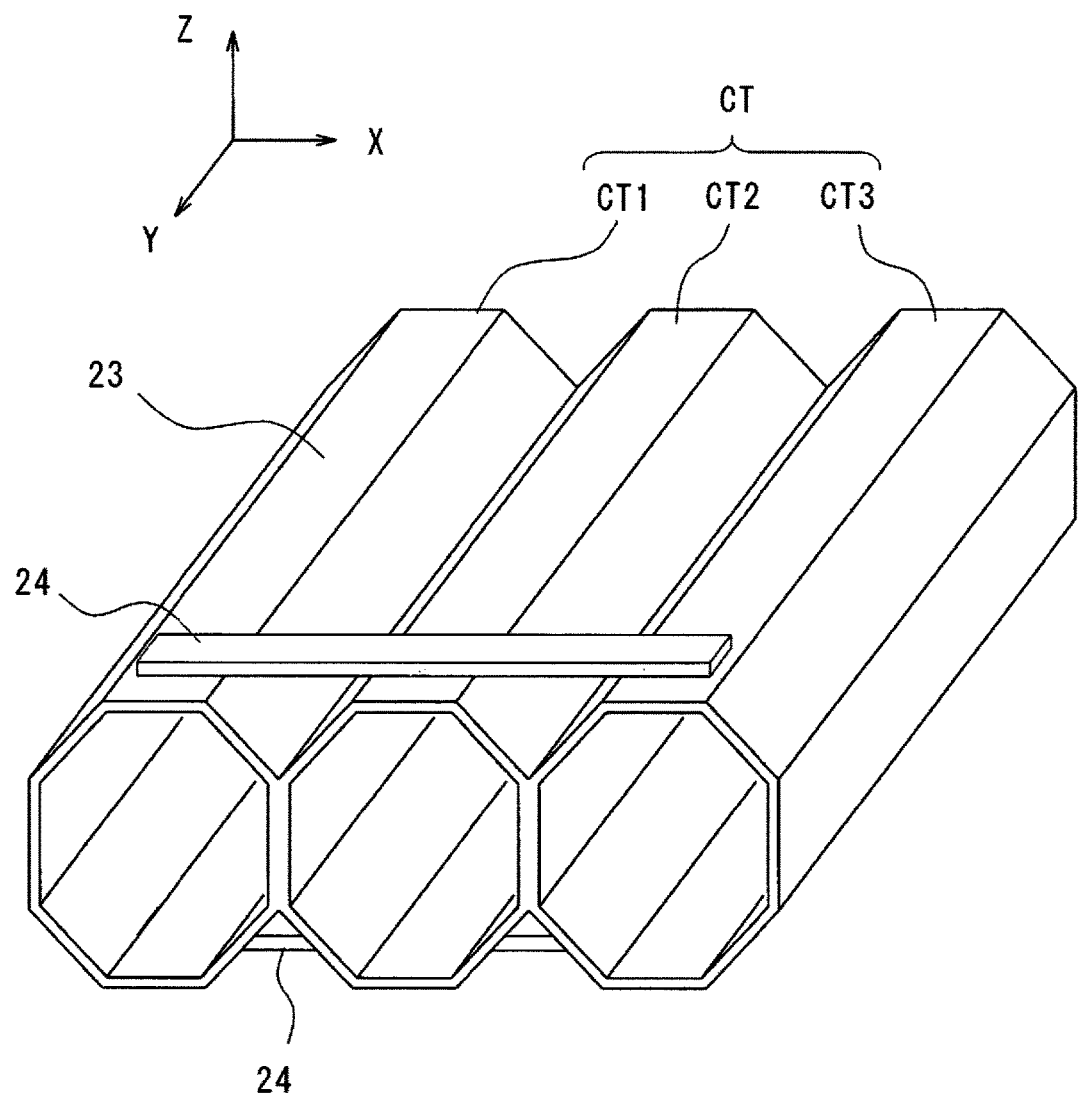
FIG. 9 is a perspective view illustrating a first modification of the deformation control member according to the first embodiment.

With reference to FIG. 9, in the first modification, a deformation control member 24 of flat plate shape is attached to the outer end portion of the reinforcement member 23 in the vehicle width direction, and top to bottom in the vehicle height direction. The deformation control member 24 is a plate material of belt shape and extends on the X-Y plane. The deformation control member 24 may be attached to the outer side of the reinforcement member 23 in the vehicle width direction, in such a manner as to cover a quarter of a total length of the reinforcement member 23 in the vehicle width direction.

Second Modification

Figure 10:
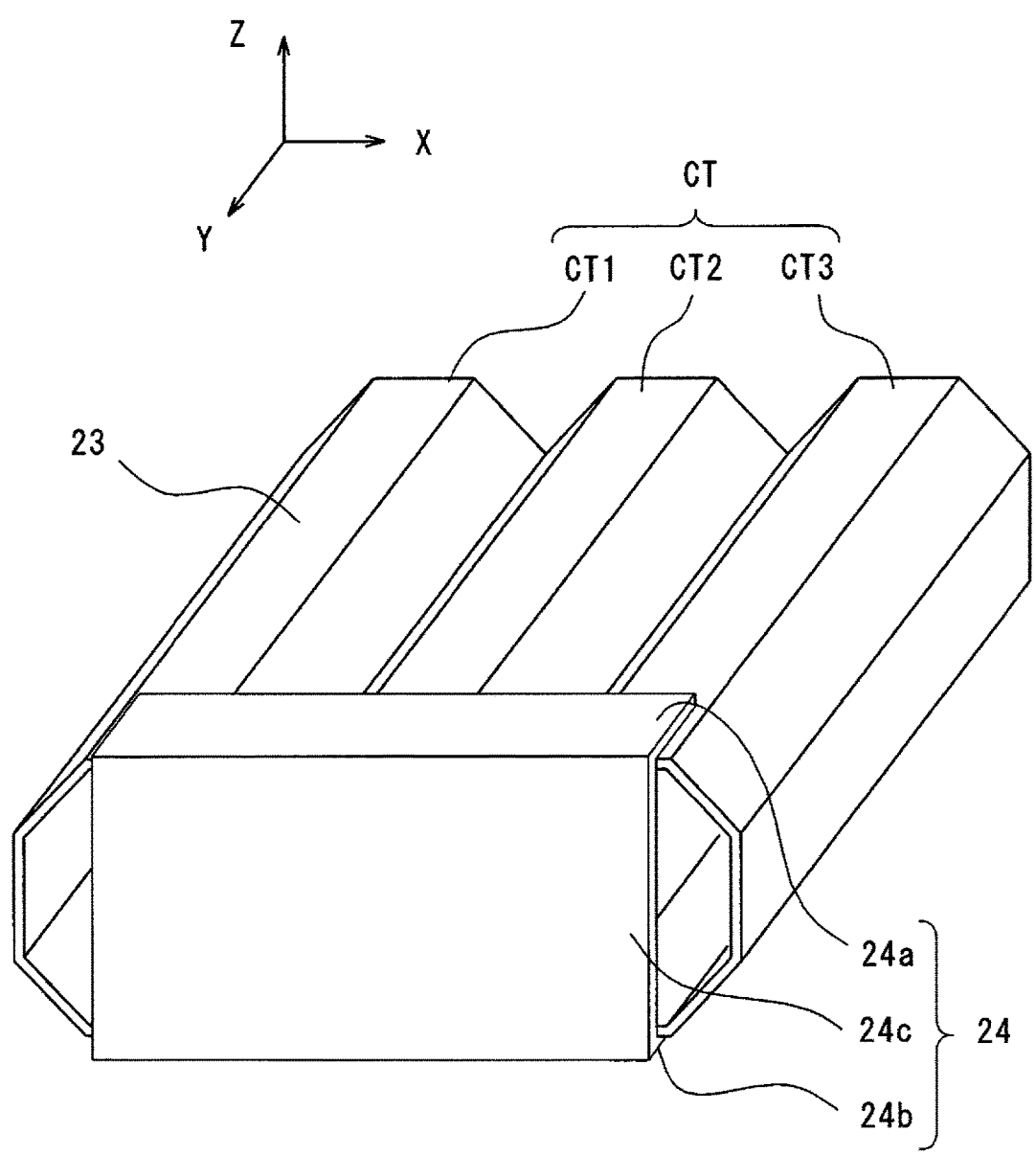
FIG. 10 is a perspective view illustrating a second modification of the deformation control member according to the first embodiment.

With reference to FIG. 10, in the second modification, a deformation control member 24 has a substantially C shape when viewed in the vehicle longitudinal direction; and the deformation control member 24 is attached to the reinforcement member 23 in such a manner as to hold in the outer end portion of the reinforcement member 23 in the vehicle width direction.

Specifically, the deformation control member 24 includes an upper plate 24a, a lower plate 24b, and a side plate 24c; and the upper plate 24a and the lower plate 24b oppose each other, and the side plate 24c connects the upper plate 24a and the lower plate 24b. Each of the upper plate 24a, the lower plate 24b, and the side plate 24c is flat plate shaped. The upper plate 24a and the lower plate 24b are respectively attached to an upper surface and a lower surface of the reinforcement member 23; and the side plate 24c is attached to the outer end surface of the reinforcement member 23 in the vehicle width direction.

Third Modification

Figure 11:
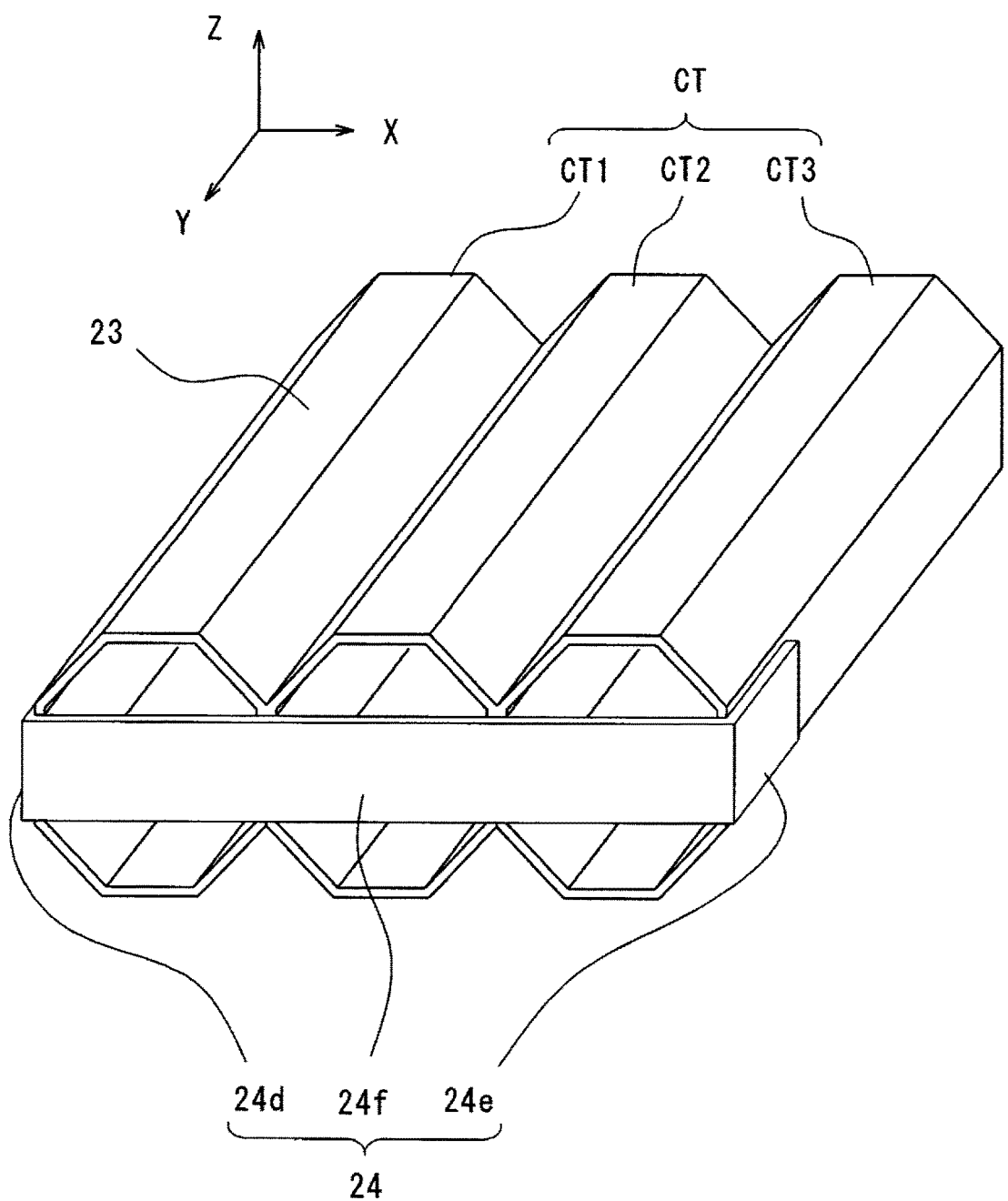
FIG. 11 is a perspective view illustrating a third modification of the deformation control member according to the first embodiment.

With reference to FIG. 11, in the third modification, a deformation control member 24 has a substantially C shape when viewed in the vehicle height direction; and the deformation control member 24 is attached to the reinforcement member 23 in such a manner as to hold in the outer end portion of the reinforcement member 23 in the vehicle width direction.

Specifically, the deformation control member 24 includes a front plate 24d, a rear plate 24e, and a side plate 24f; and the front plate 24d and the rear plate 24e oppose each other, and the side plate 24f connects the front plate 24d and the rear plate 24e. Each of the front plate 24d, the rear plate 24e, and the side plate 24f is flat plate shaped. The front plate 24d and the rear plate 24e are respectively attached to a front surface and a rear surface of the reinforcement member 23; and the side plate 24f is attached to the outer end surface of the reinforcement member 23 in the vehicle width direction.

Fourth Modification

Figure 12:
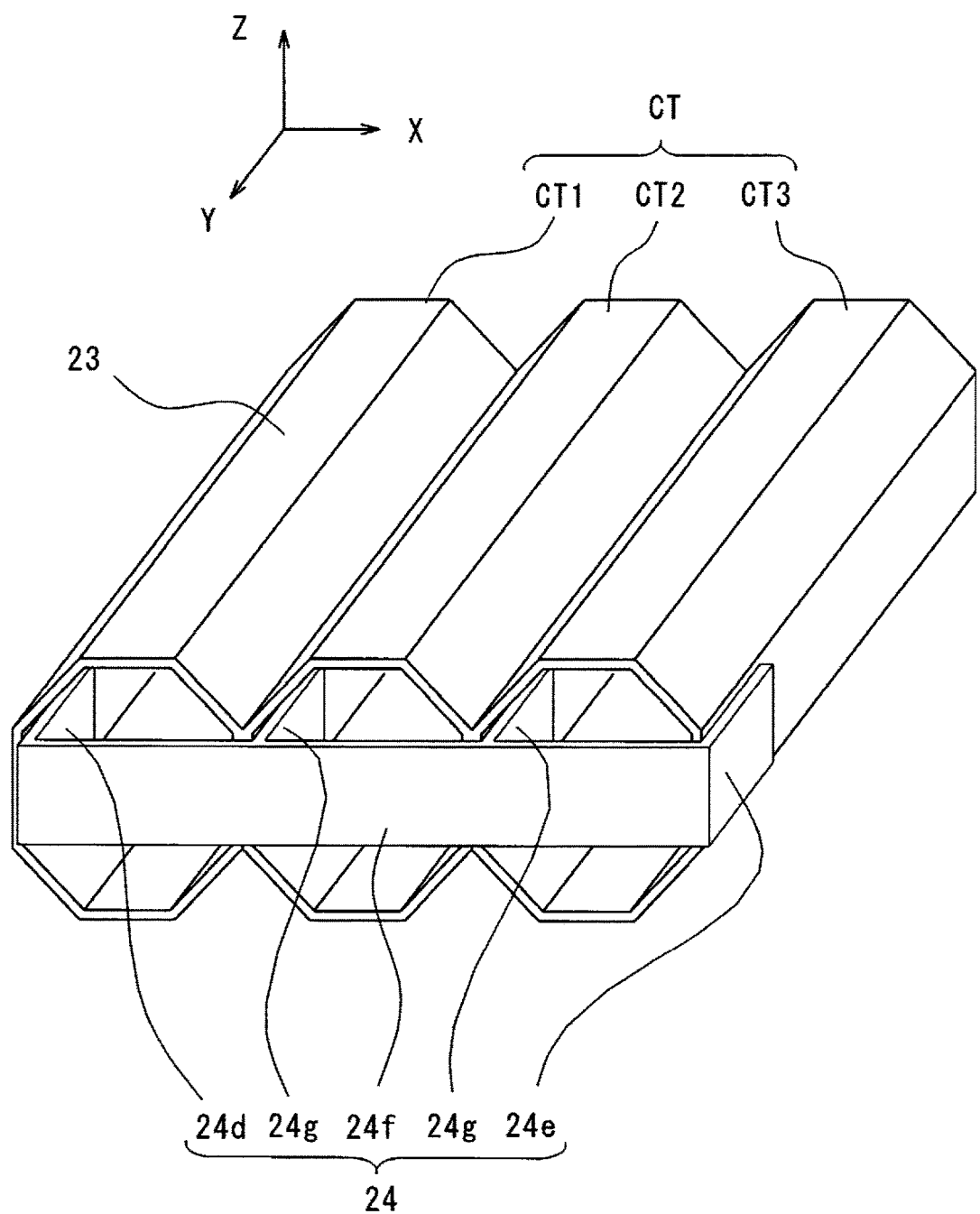
FIG. 12 is a perspective view illustrating a fourth modification of the deformation control member according to the first embodiment.

With reference to FIG. 12, in the fourth modification, the deformation control member 24 of the third modification further includes a dividing plate 24g. A plurality of the dividing plates 24g (two dividing plates in FIG. 12) oppose the front plate 24d and the rear plate 24e. The plurality of dividing plates 24g are respectively attached to inner surfaces of the cylindrical bodies CT1, CT2, and CT3 that form the continuous cylindrical structure CT of the reinforcement member 23. The front plate 24d is also attached to the inner surface of the cylindrical body CT1. Similarly to the third modification, the rear plate 24e is attached to an outer surface of the cylindrical body CT3.

Fifth Modification

Figure 13:
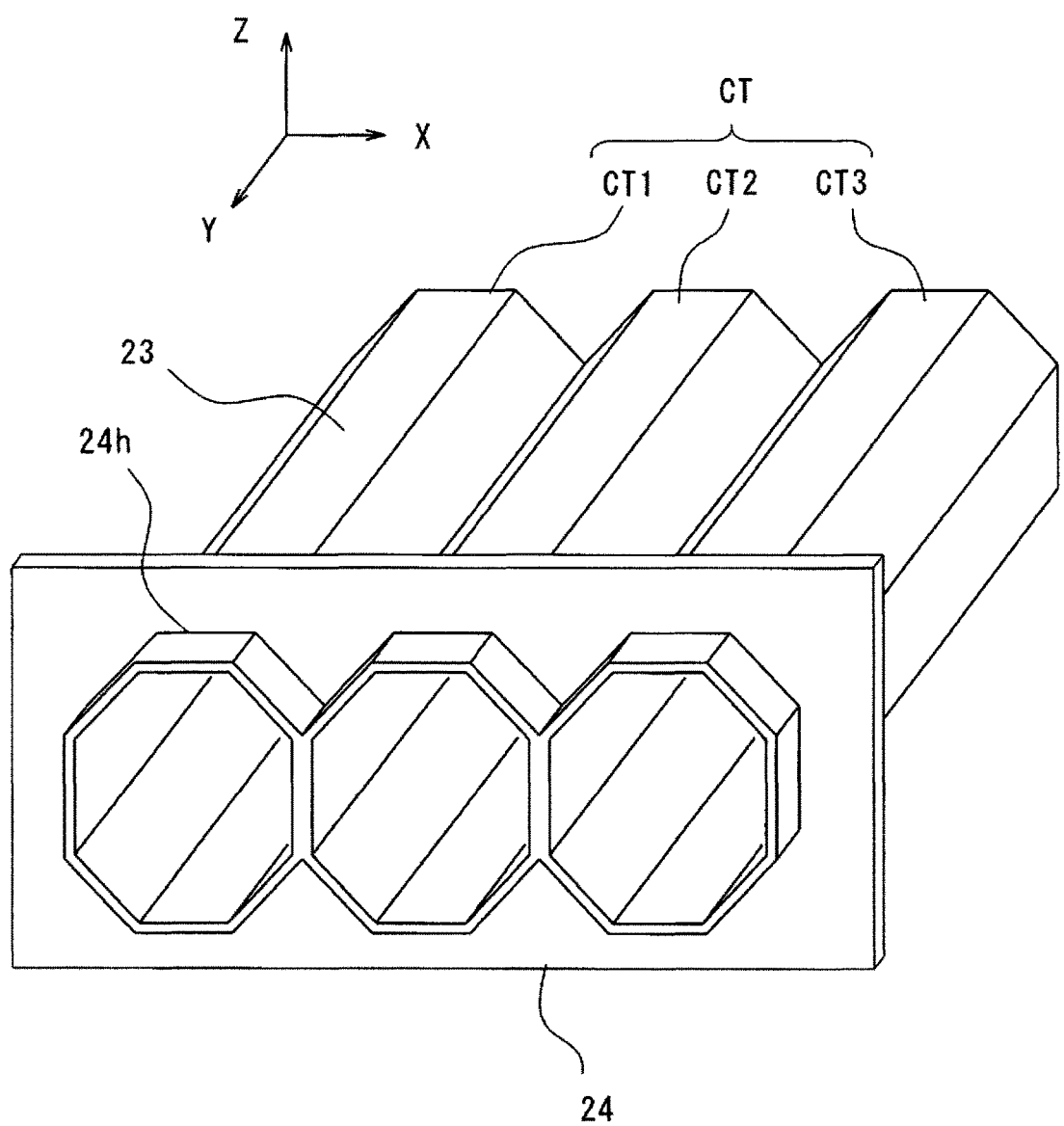
FIG. 13 is a perspective view illustrating a fifth modification of the deformation control member according to the first embodiment.

With reference to FIG. 13, in the fifth modification, a deformation control member 24 is flat plate shaped and includes a through hole 24h that is shaped in correspondence to the continuous cylindrical structure CT of the reinforcement member 23. The reinforcement member 23 is inserted through the through hole 24h of the deformation control member 24 to be fitted to the deformation control member 24.

Sixth Modification

Figure 14:
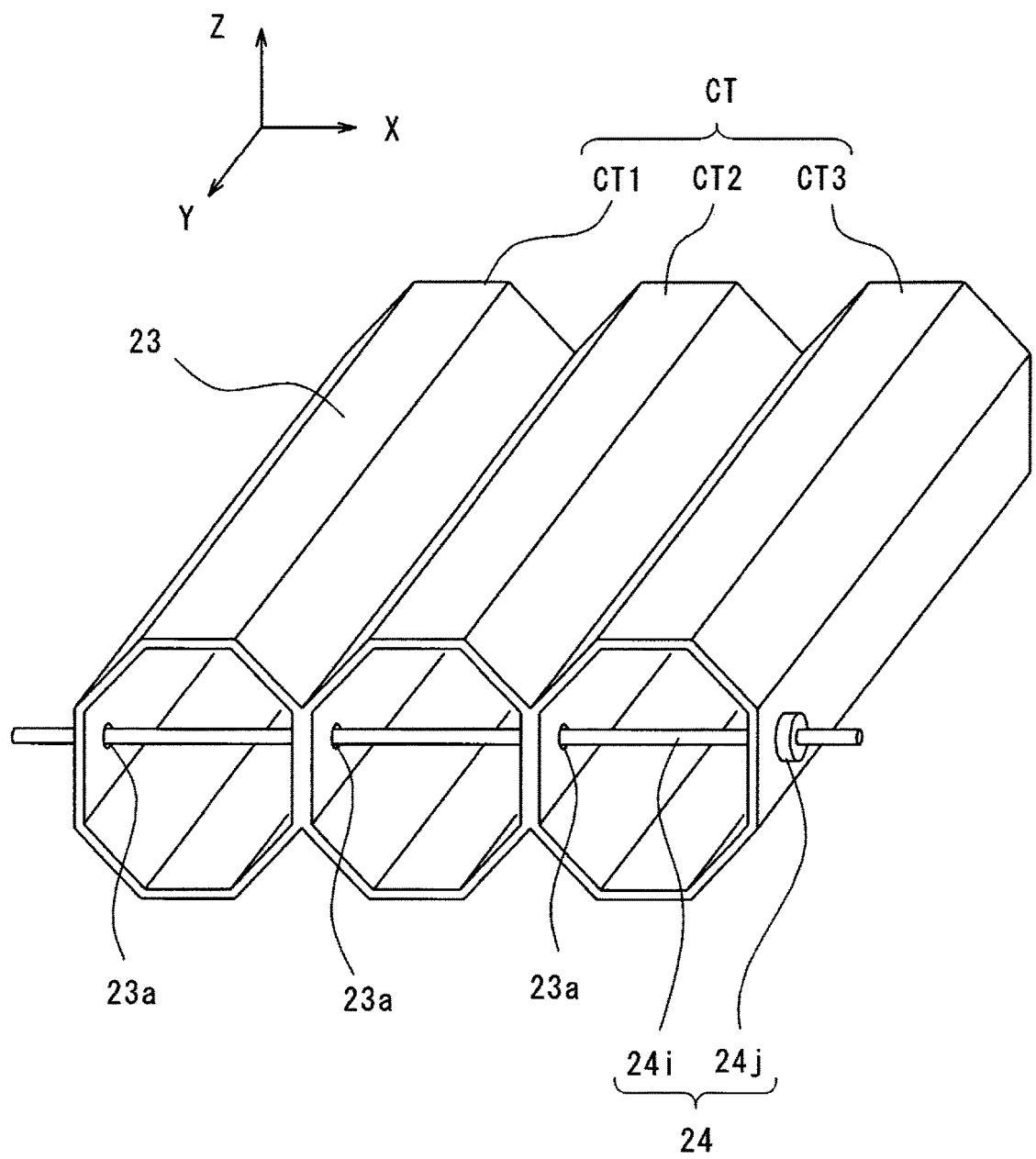
FIG. 14 is a perspective view illustrating a sixth modification of the deformation control member according to the first embodiment.

With reference to FIG. 14, in the sixth modification, a deformation control member 24 includes a bar body 24i and a nut 24j. The bar body 24i has a long and narrow cylindrical shape. The reinforcement member 23 includes a plurality of through holes 23a penetrating in the vehicle longitudinal direction. The plurality of through holes 23a are concentrically formed when viewed in the vehicle longitudinal direction, and the bar body 24i is inserted through the plurality of through holes 23a. The nut 24j abuts and is attached to an outer surface of the continuous cylindrical structure CT at each end portion of the bar body 24i. The nut 24j is configured to prevent the bar body 24i from coming out of the through hole 23a, and to restrict the deformation of the reinforcement member 23.

As has been described above, various modifications may be made to the configuration of the deformation control member 24. Further, a deformation control member 24 according to the present invention is not limited to the foregoing aspects; therefore, as long as the deformation control member 24 is configured to restrict the deformation of the reinforcement member 23 in the vehicle longitudinal direction, any other aspects may be applied to the deformation control member 24.

Second Embodiment

Figure 15:
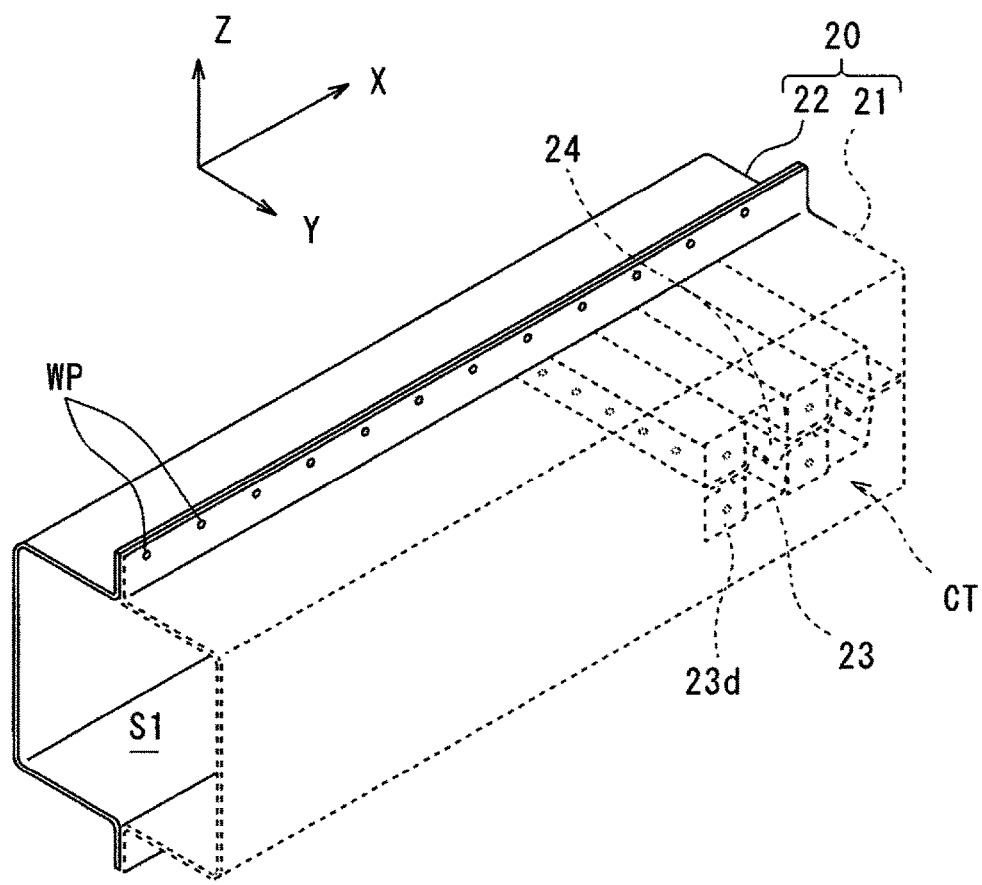
FIG. 15 is a perspective view of a portion of the side sill in a vehicle body structure according to a second embodiment, the portion where the outer member is illustrated in transparent form.
Figure 16:
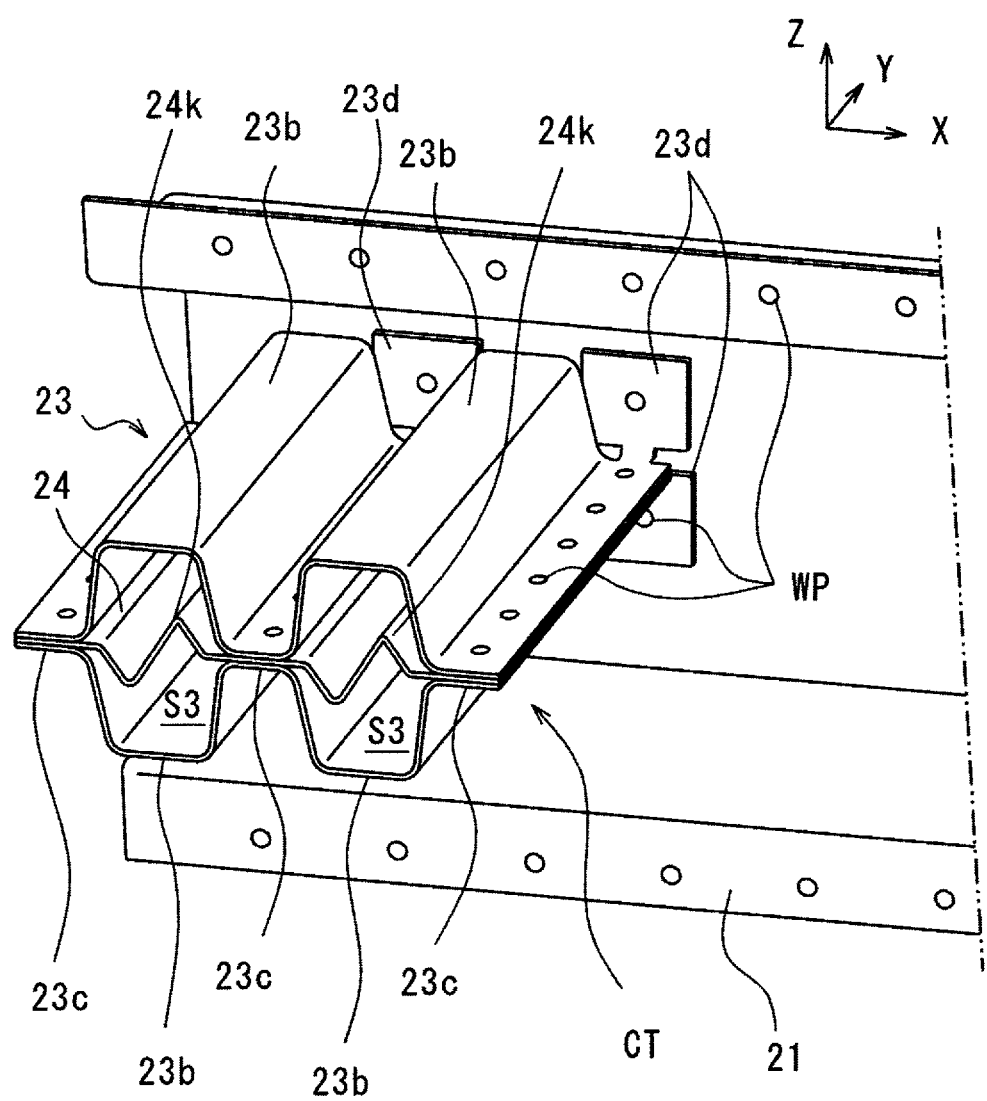
FIG. 16 is a perspective view of the portion of the side sill in FIG. 15 when viewed from another angle.

As illustrated in FIGS. 15 and 16, a vehicle body structure 1 of the second embodiment differs in configurations of a reinforcement member 23 and a deformation control member 24 from the vehicle body structure 1 of the first embodiment. Except for these configurations, the vehicle body structure 1 of the second embodiment has a configuration that is substantially identical to that of the vehicle body structure 1 of the first embodiment. Accordingly, in this embodiment, a description of the same parts as those of the first embodiment may be omitted as appropriate. In FIGS. 15 and 16, only a part of a continuous cylindrical structure CT of the reinforcement member 23 is illustrated.

In this embodiment, the reinforcement member 23 is formed of two plate materials attached to each other, each of the two plate materials made of, for example, steel. Each of the two plate materials of steel has a hat shape that is continuously projected upward or downward when viewed in the vehicle width direction. Specifically, the reinforcement member 23 includes a projection 23b having a projected shape, and a flange 23c extending from the projection 23b in a horizontal direction. The two plate materials of steel are spot welded at a plurality of weld points WP in the flange 23c and are bonded to each other.

The reinforcement member 23 further includes, at its outer end portion in the vehicle width direction, an extended portion 23d to be bonded to the outer member 21 of the side sill 20. The extended portion 23d extends from the flange 23c of the reinforcement member 23, and is bent to extend perpendicular to the flange 23c and in the vehicle height direction. The reinforcement member 23 is spot welded at the weld points WP in the extended portion 23d and is bonded to the outer member 21. Note that, the reinforcement member is not limited to the aspects described above. For example, the reinforcement member 23 may alternatively be made of aluminum alloy. Further, the reinforcement member 23 may be formed of two or even more of the plate materials.

In this embodiment, the deformation control member 24 is plate shaped and is bonded to the reinforcement member 23 (as the plate materials) in a state of being sandwiched between the plate materials; and when viewed in the vehicle width direction, the deformation control member has a wavy portion 24k formed in a wave shape. In this embodiment, the deformation control member 24 is bonded to the reinforcement member 23 by spot welding, but the present invention is not limited thereto. The deformation control member 24 may be bonded to the reinforcement member 23 by other types of welding or by mechanical bonding. The wavy portion 24k is disposed in a space S3 inside the projection 23b of the reinforcement member 23.

In this embodiment, the reinforcement member 23 is formed of the plate materials and is thus easily manufactured. This configuration increases versatility of the reinforcement member 23.

Further, the deformation control member 24, having the wavy portion 24k, is elastic to a certain degree in the vehicle longitudinal direction. Accordingly, it is possible to maintain deformation effective enough to absorb the collision energy at the side collision of the vehicle body, and concurrently, it is possible to improve the collision energy absorption performance.

Preferably, when viewed in the vehicle width direction, the deformation control member 24 having the wavy portion 24k has a linear length increased to 1.2 times or more a linear length that the deformation control member 24 of a straight line shape has. More preferably, when viewed in the vehicle width direction, the deformation control member having the wavy portion 24k has the linear length increased 1.5 times or more the linear length that the deformation control member 24 of the straight line shape has. With this configuration, the deformation control member 24 is sufficiently elastic in the vehicle longitudinal direction. Accordingly, it is possible to maintain the deformation effective enough to absorb the collision energy at the side collision of the vehicle body, and concurrently, it is possible to further improve the collision energy absorption performance.

The configurations of the reinforcement member 23 and the deformation control member 24 are not limited to the foregoing embodiment and various modifications may be made. The reinforcement member 23 and the deformation control member 24 according to the various modifications will be described below.

Modification

Figure 17:
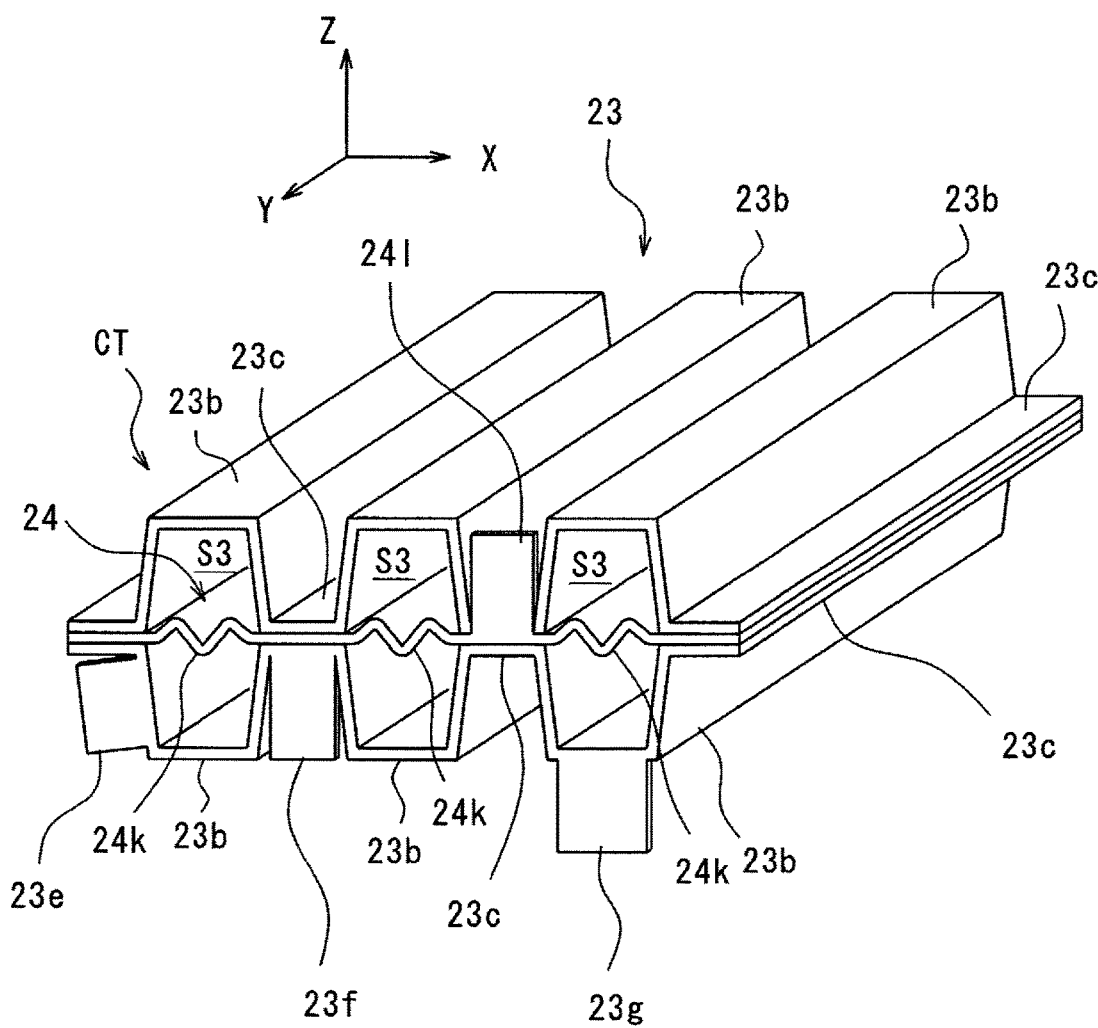
FIG. 17 is a perspective view illustrating a modification of a reinforcement member and a deformation control member in the vehicle body structure according to the second embodiment.

With reference to FIG. 17, in this modification, the extended portion 23d (see FIGS. 15 and 16) is provided at various locations. In FIG. 17, any one of the weld points WP (see FIGS. 15 and 16) is omitted.

With reference to a symbol 23e, an extended portion 23e may extend from a side surface of the projection 23b of the reinforcement member 23. With reference to a symbol 23f, an extended portion 23f may extend from the flange 23c of the reinforcement member 23. The extended portion 23f is at a substantially same position as the extended portion 23d in FIGS. 15 and 16. Further, with reference to a symbol 23g, an extended portion 23g may extend from the upper surface or the lower surface of the reinforcement member 23.

Alternatively, the extended portion may be provided in the deformation control member 24. With reference to a symbol 24l, an extended portion 24l may be provided at a flat portion between the wavy portions 24k of the deformation control member 24.

In the foregoing modification, at the side collision of the vehicle body, the side sill 20 and the reinforcement member 23, or the side sill 20 and the deformation control member 24, are integrally deformed. Accordingly, the reinforcement member 23 is less prone to be broken by bending deformation or is less prone to fall on either side, so that the reaction force of the reinforcement member 23 is improved. Still accordingly, the collision energy absorption performance is improved and a vehicle cabin and the battery are thus reliably protected, thereby securing a side collision safety performance required of an electric vehicle. Note that, the extended portion is not essential in the configuration, and may be omitted as needed. Alternatively, in place of the extended portion, a bracket as another member having the same function as the extended portion may be attached to the reinforcement member 23 or the deformation control member 24.

Embodiments and modifications of the present invention have been specifically described above; however, the present invention is not limited to the foregoing embodiments, and various changes and modifications may be made without departing from the scope of the present invention. For example, the respective elements described in the foregoing embodiments and modifications may be combined appropriately as an embodiment of the present invention.

The invention claimed is:
1. A vehicle body structure comprising:
a battery disposed at a central lower portion of a vehicle body;

a side sill of a hollow shape, the side sill disposed at an outer side of the battery in a vehicle width direction and extending in a vehicle longitudinal direction;

a reinforcement member disposed inside the side sill, having a closed cross section of a polygonal shape, and having a continuous tubular structure where a plurality of the closed cross sections are continuous when viewed in the vehicle width direction; and a deformation control member attached to the reinforcement member and configured to control a deformation of the continuous tubular structure of the reinforcement member in the vehicle longitudinal direction; wherein each of the plurality of closed cross sections has a pair of opposing sides extending in the vehicle width direction and has a height, and adjacent pairs of the closed cross sections share one of the opposing sides;

the continuous tubular structure consists of a single row of the closed cross sections having said height extending in the vehicle front-rear direction;

the deformation control member is attached to the reinforcement member at outside peripheral surfaces of each of the plurality of the closed cross sections; and the deformation control member is separate from the side sill.

2. The vehicle body structure according to claim 1, wherein
the deformation control member is attached to an end portion of the reinforcement member in the vehicle width direction.

3. The vehicle body structure according to claim 2, wherein
the end portion of the reinforcement member in the vehicle width direction corresponds to an outer end portion of the reinforcement member in the vehicle width direction.

4. The vehicle body structure according to claim 1, wherein
the reinforcement member is formed of two or more plate materials attached to each other, each of the two or more plate materials made of an aluminum alloy or a steel.

5. A vehicle body structure, comprising:
a battery disposed at a central lower portion of a vehicle body;
a side sill of a hollow shape, the side sill disposed at an outer side of the battery in a vehicle width direction and extending in a vehicle longitudinal direction;
a reinforcement member disposed inside the side sill, having a closed cross section of a polygonal shape, and having a continuous tubular structure where a plurality of the closed cross sections are continuous when viewed in the vehicle width direction; and
a deformation control member attached to the reinforcement member and configured to control a deformation of the continuous tubular structure of the reinforcement member in the vehicle longitudinal direction; wherein
the reinforcement member is formed of two or more plate materials attached to each other, each of the two or more plate materials made of an aluminum alloy or a steel,
the deformation control member is plate shaped and is bonded to the reinforcement member as the two or more plate materials in a state of being sandwiched between the two or more plate materials, and
when viewed in the vehicle width direction, the deformation control member has a wavy portion formed in a wave shape.

6. The vehicle body structure according to claim 5, wherein
when viewed in the vehicle width direction, the deformation control member having the wavy portion may have a linear length increased to 1.2 times or more a linear length that the deformation control member of a straight line shape has.

7. The vehicle body structure according to claim 1, wherein
the reinforcement member or the deformation control member is bonded to the side sill at an outer end portion of the reinforcement member in the vehicle width direction or at an outer end portion of the deformation control member in the vehicle width direction.

8. The vehicle body structure according to claim 1, wherein
each of the plurality of closed cross sections is formed in a hexagonal or octogonal polygonal shape.

9. The vehicle body structure according to claim 2, wherein
the reinforcement member is formed of two or more plate materials attached to each other, each of the two or more plate materials made of an aluminum alloy or a steel.

10. The vehicle body structure according to claim 3, wherein
the reinforcement member is formed of two or more plate materials attached to each other, each of the two or more plate materials made of an aluminum alloy or a steel.

11. The vehicle body structure according to claim 2, wherein
the reinforcement member or the deformation control member is bonded to the side sill at an outer end portion of the reinforcement member in the vehicle width direction or at an outer end portion of the deformation control member in the vehicle width direction.

12. The vehicle body structure according to claim 3, wherein
the reinforcement member or the deformation control member is bonded to the side sill at an outer end portion of the reinforcement member in the vehicle width direction or at an outer end portion of the deformation control member in the vehicle width direction.

13. The vehicle body structure according to claim 5, wherein
the deformation control member is attached to an end portion of the reinforcement member in the vehicle width direction.

14. The vehicle body structure according to claim 13, wherein
the end portion of the reinforcement member in the vehicle width direction corresponds to an outer end portion of the reinforcement member in the vehicle width direction.

* * * * *